(12) United States Patent
Rosenberger et al.

(10) Patent No.: US 6,597,855 B2
(45) Date of Patent: Jul. 22, 2003

(54) FEED-THROUGH SEAL FOR A HIGH-POWER LASER FIBER OPTIC CABLE

(75) Inventors: Brian Taylor Rosenberger, Aledo, TX (US); William Michael Carra, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 8 days.

(21) Appl. No.: 09/909,606

(22) Filed: Jul. 20, 2001

(65) Prior Publication Data

US 2003/0016936 A1 Jan. 23, 2003

(51) Int. Cl.[7] .............................. G02B 6/00; G02B 6/36
(52) U.S. Cl. ........................................ 385/138; 385/134
(58) Field of Search ................................ 385/138, 134, 385/43

(56) References Cited

U.S. PATENT DOCUMENTS

| | | | | |
|---|---|---|---|---|
| 4,119,363 A | * | 10/1978 | Camlibel et al. | 385/91 |
| 4,865,410 A | * | 9/1989 | Estrada et al. | 385/92 |
| 5,054,877 A | * | 10/1991 | Ortiz et al. | 385/33 |
| 5,113,461 A | * | 5/1992 | Ortiz, Jr. | 385/53 |
| 5,289,553 A | * | 2/1994 | Ortiz et al. | 385/74 |
| 5,325,456 A | * | 6/1994 | Cullen et al. | 385/138 |
| 5,452,390 A | * | 9/1995 | Bechtel et al. | 385/92 |
| 5,852,692 A | * | 12/1998 | Nightingale et al. | 385/43 |
| 6,115,528 A | * | 9/2000 | Schmucker et al. | 385/138 |

OTHER PUBLICATIONS

Losch LD–80 Data Sheet, 1998, Richard Losch, Inc.

* cited by examiner

Primary Examiner—Michael C. Zarroli
(74) Attorney, Agent, or Firm—Hughes & Luce LLP

(57) ABSTRACT

A lasing system for forming a sealed barrier between a process environment and an environment external to the process environment. The lasing system includes a wall enclosing the process environment. The lasing system also includes a laser connector coupled to the wall and a line. It should also be added that in one exemplary embodiment, the laser connector is configured to be releasably coupled to the wall and the line. The line, such as for example a fiber optic line, provides the lasing system with laser energy from a high-powered laser. In one exemplary embodiment, the energy from the laser is between 100 to about 1000 watts. Operatively, the wall and the laser connector form an environmental barrier between the process environment and the outside environment.

15 Claims, 3 Drawing Sheets

FEED-THROUGH SEAL FOR A HIGH-POWER LASER FIBER OPTIC CABLE

BACKGROUND OF THE INVENTION

The present invention generally relates to a system and method for directing high-powered laser energy through a connector unit for use within a process environment. More particularly, this invention relates to a system and method for establishing an environmental barrier between the process environment and the outside environment from which the laser energy is received therefrom.

DESCRIPTION OF THE RELATED ART

Today, many typical industrial applications of high-powered lasers implement an open beam laser for a process operation. For example, in welding applications, open beam lasers are used to join components together. In these industrial settings, however, open beam cutting can pose a potential danger to nearby personnel by exposing them to harmful vapors and residual debris arising from the open beam cutting process. Moreover, the task of re-directing open beam lasers is tedious as well as hazardous. Typically, open beam laser beams are ultimately re-directed toward a process operation according to the meticulous placement of mirrors. A misguided beam could damage the process operation in which the beam is applied to. For example, a misguided beam could damage component parts to be welded and possibly injure nearby personnel.

In terms of cost and safety issues, the application of open beam lasers is not acceptable. In the attempt to address these issues, some high-powered lasers are provided through a closed beam arrangement. A typical closed beam arrangement involves providing a beam through a large rigid protective shelter, such as an opaque tube. Due to the rigid nature of the enclosing, although providing limited safety by restricting objects from passing through the beam, re-directing a closed laser beam toward a desired application is difficult.

Currently, in terms of safety, there is a growing trend to provide high-powered laser beams through a fiber optic line. Fiber optic lines re-direct a passing beam with negligible loss in fidelity, thus allowing the lines to transfer a high-powered laser beam through them.

The task of introducing laser beams into a closed environment, such as for example a vacuum chamber, a pressure vessel, or a closed chamber to isolate hazardous material, is not typically provided in high-powered laser applications. Accordingly, the laser industry does not currently provide a coupling arrangement to transfer high-powered laser energies from a fiber optic line to an application within a closed environment while maintaining the environmental integrity of that closed environment. Moreover, most typical connector arrangements are not cost effective, replaceable or easy to use. This is especially true for those that feed laser energies from a high-powered line into a process environment. Many other problems and disadvantages of the prior art will become apparent to one skilled in the art after comparing such priority with the present invention as described herein.

BRIEF SUMMARY OF THE INVENTION

Aspects of the invention are found in a lasing system that receives high-powered laser energy from a line. The lasing system forms a sealed barrier between a process environment and an environment external to the process environment. In one aspect, a wall encloses the process environment and provides an environmental barrier from the outside environment. In another aspect, a sealer isolates the process environment to an external environment. In another aspect, a process operation, located within the process environment, performs a function using the received laser energy. In one exemplary embodiment, laser energy that is transmitted through a line and received by a process operation is in the range between 100 to about 1000 watts. Illustratively, a process operation may include a welding operation where laser energy is used to join components together. Additionally, among other functions, a process operation may include testing the mechanical characteristics of a system, such as for example strength and fracture characteristics, using laser energy.

In a further aspect, a laser connector is releasably coupled to the line and to the wall. As such, various aspects of the invention may quickly and effortlessly be repaired or replaced in a cost effective manner.

Other aspects, advantages, and novel features of the present invention will become apparent from the detailed description of the invention when considered in conjunction with the accompanying drawings. Many other beneficial results can be attained by applying the disclosed invention in a different manner or modifying the invention as will be described. Accordingly, a fuller understanding of the invention may be had by referring to the following detailed description.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
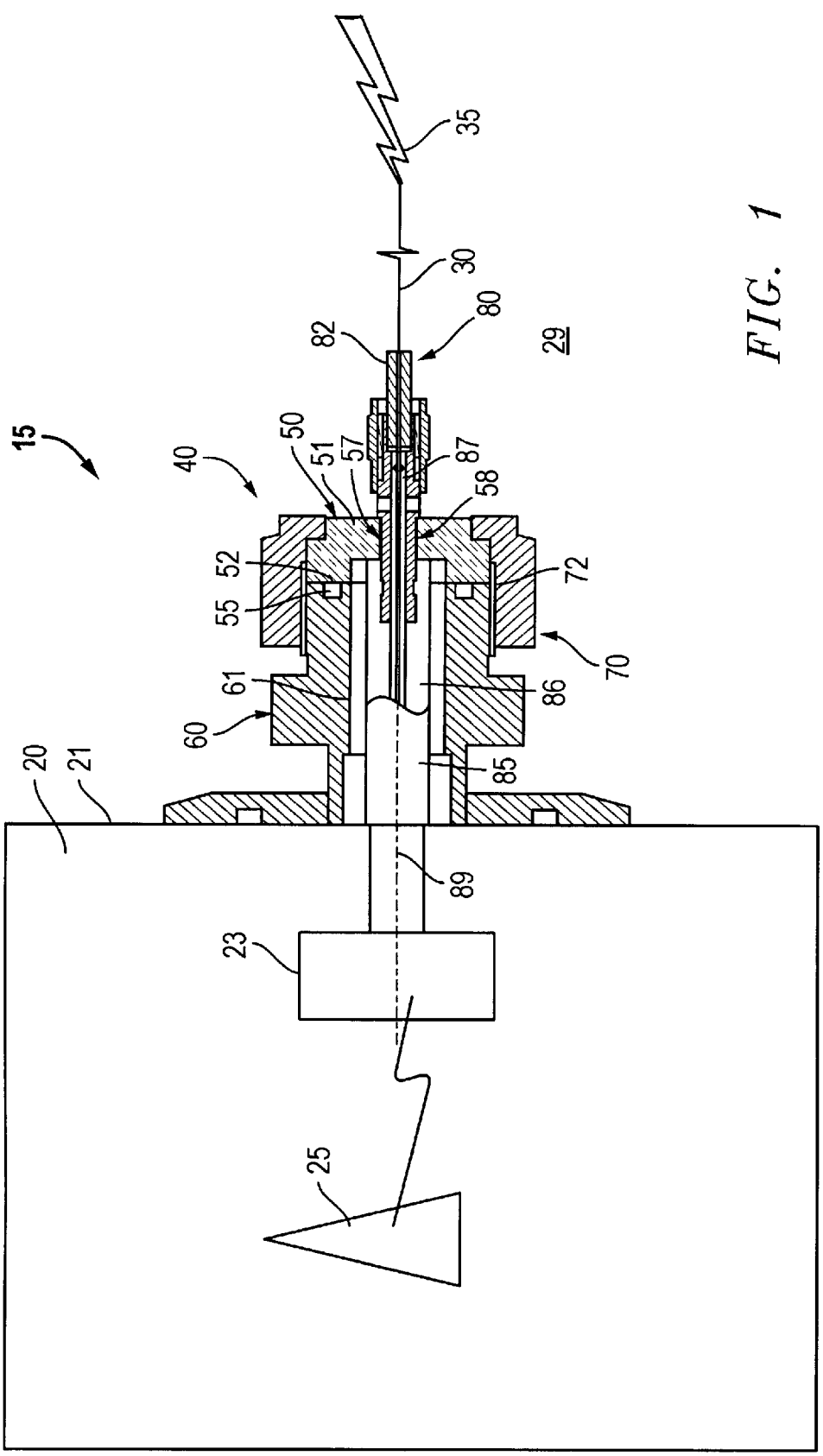
FIG. 1 is a schematic diagram of a lasing system according to the invention.

FIG. 1 is an exemplary schematic diagram of a lasing system, according to the invention. A lasing system 15 receives high-powered laser energy 35 from a line 30. The lasing energy 35 is transmitted across the line 30 to a laser connector 40. The laser connector 40 is coupled to the line 30 and to a wall 21.

The line 30 may be any suitable optical medium for the transmission of high-powered laser energy 35. Illustrative examples for such a line may include air, glass, vacuum, plastics, and a fiber optic line, among others.

Figure 2:
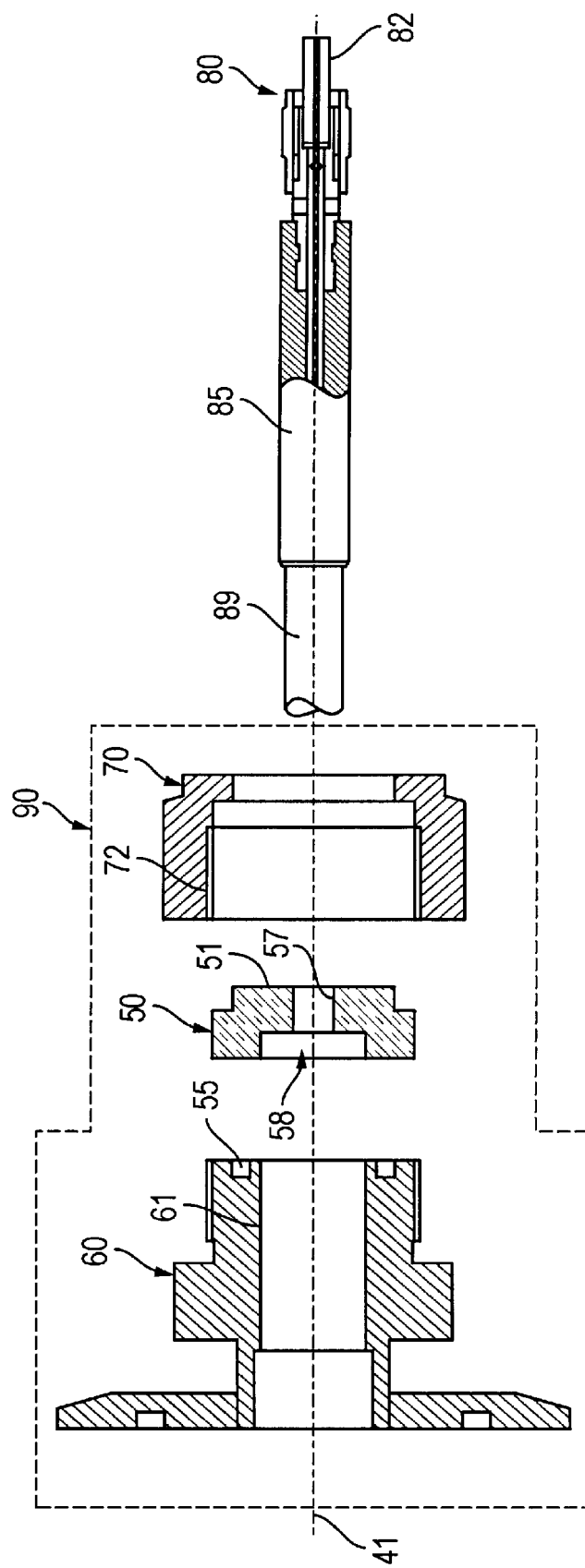
FIG. 2 is a schematic diagram detailing exemplary aspects of the lasing system of the invention.
Figure 3:
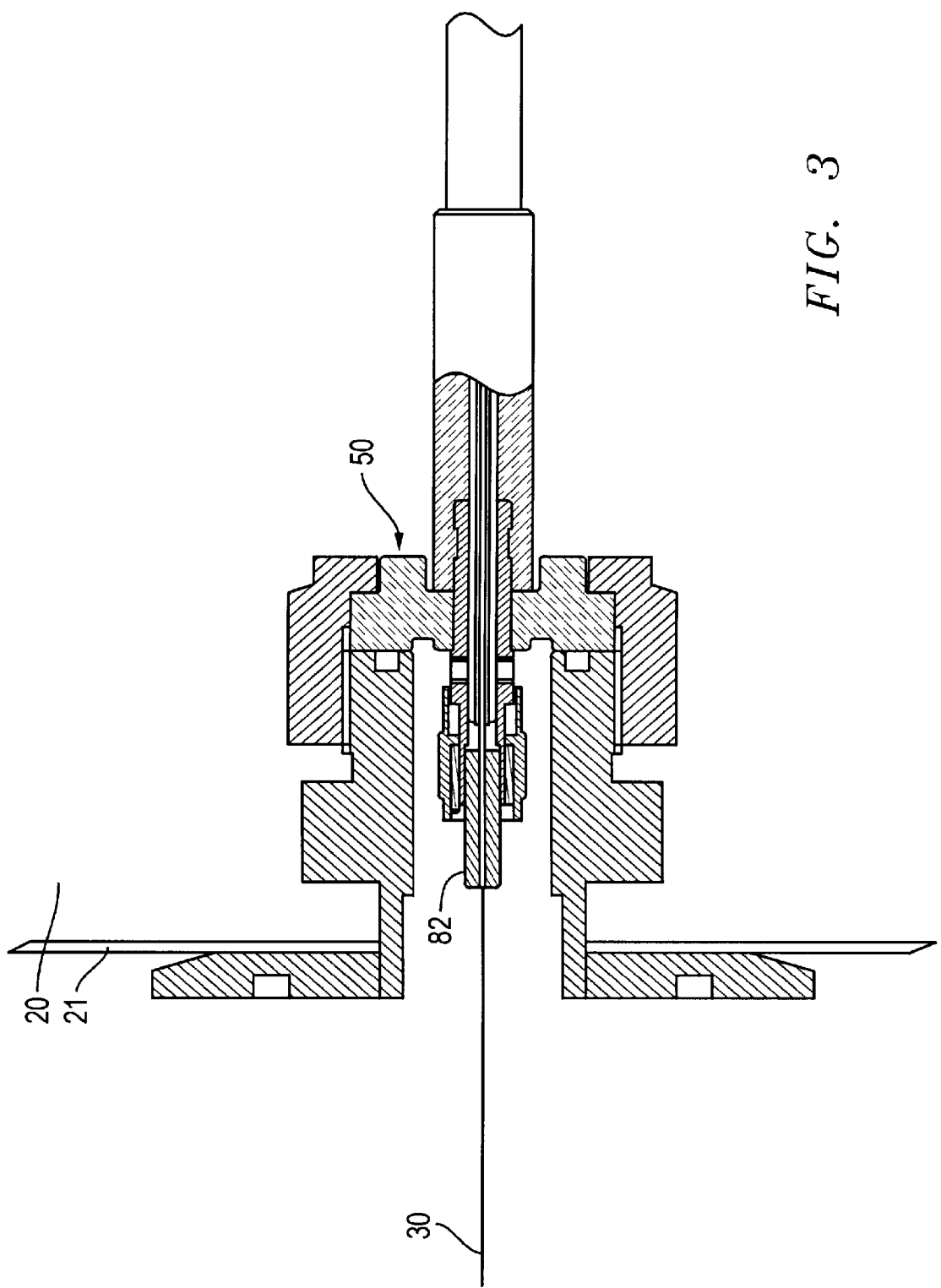
FIG. 3 is a schematic diagram of another embodiment of the lasing system of the invention of FIG. 1.

Shown in FIG. 1, the wall 21 encloses a process environment 20. The wall 21 environmentally seals the process environment from an outside environment. In FIGS. 1–3, the outside environment is recognized as that which is external to the process barrier 21.

A process operation 25, located within the process environment 20, performs a function using the received laser energy 35. Illustratively, in one embodiment, a vacuum 20 exerts a negative pressure on the barrier 21 as the process operation 25 receives high-powered laser energy 35 for mechanically inspecting a system. In another exemplary embodiment, the wall 21 may define a pressure vessel so that a process operation 25 receives high-powered laser energy 35 for manufacturing-related applications. It should be added that a process interface 23 may be provided by the process environment 20 to facilitate reception and/or transmission of high-powered laser energy 35 for use with the process operation 25.

In one exemplary embodiment, the process operation 25 receives the lasing energy 35 in a range between 10 and 200 watts. In another embodiment, lasing energy is received by the lasing system 15 in a range between 200 to about 1400 watts. In yet another exemplary embodiment, the lasing energy 35 may be sent through the line 30 in a range between 1400 to about 10000 watts.

As shown in FIG. 1 and FIG. 2, the lasing connection system 15 includes a mounter 60 and a connector 80. The lasing connection system 15 and the wall 21 operate to form an environmental seal between the process environment 20 and the outside environment. In FIG. 1, the mounter 60 is coupled to the process wall 21. The mounter 60 has a means for coupling to the process environment 20. The mounter 60 may include a mounting passageway 61 for the transmission of energy 35 from a laser to the process environment 20.

Shown in FIG. 1 and FIG. 3, the connector 80 is coupled to the mounter 60 and the line 30. The connector 80 receives the energy 35 from the line 30 and directs the energy to the process environment 20.

A sealer 50 is coupled to the connector 80 and the mounter 60. The sealer 50 isolates the process environment 20 to an external environment. The sealer 50 includes a sealing body 51. In one exemplary embodiment, as shown in FIG. 2, the sealing body 51 defines a sealing channel 58. In operation, the connector 80 is in sealed contact with the sealing channel 58. A sealed contact isolates the process environment to an external environment. One example, among others, of a sealed contact between the sealed channel 58 and the connector 80 is a braze weld.

The sealing body 51 can includes a sealing face 52. To form an environmental barrier between the process environment and the outside environment, the sealing face 52 is positioned against the mounter 60. Moreover, the sealer 50 may include at least one system seal 55. The system seal 55 is disposed between the sealing body 51 and the mounter 60 to establish a barrier for isolating the process environment.

As shown in FIGS. 1–2, an interface connection 70 receives the sealing body 51. The interface connection 70 is coupled to the wall 21. Accordingly, for the exemplary embodiments of FIGS. 1–3, the sealing body 51 joins with the mounter 60 via the interface connection 70.

In one embodiment, a laser connector unit 40 is releasable from coupling with the wall 21 of the process environment 20. Particularly, the connector 80 of the laser connection unit 40 is releasably coupled to the mounter 60 and the line 30. The interface connection 70 may be releasable from the mounter 60. The sealer 50 may be releasable from the interface connection 70. The mounter 60 in one exemplary embodiment is releasable from the wall 21.

In general, as shown in FIGS. 1–3, lasing in a process environment 20 operatively includes generating laser energy 35 from a high-powered laser (not shown). The laser energy 35 is transmitted through a line 30 to a lasing system 15. The lasing system 15 includes a laser connector 40 and a wall 21 enclosing the process environment 20. The laser connector 40 and the wall 21 thus form an environmental barrier between the process environment 20 and an outside environment 29.

Alternatively, one exemplary embodiment provides linking a process environment 20 to a lasing system 15 through a line 30. As such, the line 30 is placed in a connector line interface 82 provided by the connector 80. The line 30 passes through the connector line interface 82 through a connector 80.

The line 30 passes through the connector 80 from the connector line interface 82 through a connector shell 85 to a feeder line 89 positioned within the process environment 20. Ultimately, the feeder line 89 is coupled to the process operation 25 to deliver lasing energy thereto. To relieve the line 30 of mechanical strain, the line is set within strain relief material 86 of a type well known in the industry, such as for example rubber. It should be also added that shell potting 87 is provided to mechanically affix the laser energy transmission line 30 to the connector shell 85 as well as to provide an environmental seal.

As is typical in the high-powered laser industry, the connector 80 is primarily composed of metallic materials. Some examples of high-powered laser connections are the losch LD 80 by Richard Losch, Inc. of Bend, Oreg. and Pave-Optic Seal by Pave Technology Company of Dayton, Ohio.

Continuing with the exemplary embodiment, the connector 80 couples to a mounting flange 60. The mounting flange 60 includes a passageway 61 for the transmission of high-powered laser energy 35 from the line and directs the energy to the process environment 20. A sealing assembly 50 seals the interface between the connector 80 and the mounter 60.

FIG. 3 is another schematic diagram detailing an embodiment of the invention of FIG. 1 and FIG. 2, whereby a laser connection system 15 is positioned against and intersects with the barrier 21. As such, the connection interface 82 is sheltered within the mounter 60 to protect the juncture of the connection interface 82 with the line 30. Accordingly, the barrier 21 and the laser connection system 40 form a sealed barrier for isolating the process environment 20. Accordingly, a sealing assembly 50 forms an environmental barrier between the process environment and an external environment.

As such, a system for coupling energy from a high-powered laser to a process operation within a process environment is described. Additionally, a releasable connection system for engagement to a wall enclosing a process environment and receiving high-powered laser energies is described. In view of the above detailed description of the present invention and associated drawings, other modifications and variations will now become apparent to those skilled in the art. It should also be apparent that such other modifications and variations might be effected without departing from the spirit and scope of the present invention as set forth in the claims that follow.

What is claimed is:

1. A laser connector unit, the connector coupling the energy from a laser to a process operation within a process environment, the energy from the laser delivered through a line, the connector unit comprising:

a mounter;
   the mounter having a passageway for the transmission of the energy from the laser to the process environment;

a connector coupled to the mounter and the line;
   the connector receiving the energy from the line and directing the energy to the process environment;

a sealer, coupled to the connector and the mounter;
   the sealer isolating the process environment from an external environment; and an interface connection, wherein the mounter joins with the sealer via the interface connection.

2. The laser connector unit according to claim 1 wherein the sealer includes a sealing body.

3. The laser connector unit according to claim 1 wherein the sealer includes a system seal.

4. The laser connector unit according to claim 1 wherein the energy from the laser is between 10 and 200 watts.

5. The laser connector unit according to claim 1 wherein the energy from the laser is between 200 to about 1400 watts.

6. The laser connector unit according to claim 1 wherein the energy from the laser is between 1400 to about 10000 watts.

7. A laser connector unit, the connector coupling the energy from a laser to a process operation within a process environment, the energy from the laser delivered through a line, the connector comprising:

a mounter;
the mounter having a passageway for the transmission of the energy from the laser to the process environment;

a connector releasably coupled to the mounter and the line;
the connector receiving the energy from the line and directing the energy to the process environment; and a sealer, coupled to the connector and the mounter;
the sealer isolating the process environment from an external environment.

8. The laser connector unit according to claim 7, further comprising an interface connection, coupled to the connector and the mounter;
the interface connector receiving the connector and allowing transmission of the laser energy to the passageway.

9. A releasable connection module, the releasable connection module external to a wall enclosing a process environment and receiving energy from a laser delivered through a line, via a connector, the releasable connection module comprising:

a sealing body,
the sealing body defining a sealing channel;
the connector in sealed contact with the sealing channel; and an interface connection coupled to the wall;
the interface connection receiving the sealing body, and
wherein the sealing body is releasable from the interface connection.

10. The releasable connection module according to claim 9 further comprising a mounter;
the mounter coupled to the wall.

11. The releasable connection module according to claim 10 wherein the mounter joins with the sealing body via the interface connection.

12. The releasable connection module according to claim 11 wherein the interface connection is releasable from the mounter.

13. The releasable connection module according to claim 10 wherein the mounter is releasable from the wall.

14. The releasable connection module according to claim 9 further including a system seal positioned between the mounter and the sealing body.

15. The releasable connection module according to claim 14 wherein the system seal is releasable from between the mounter and the sealing body.

* * * * *